US010479245B2

(12) United States Patent
Kormos et al.

(10) Patent No.: US 10,479,245 B2
(45) Date of Patent: Nov. 19, 2019

(54) BRACKET SUBASSEMBLY AND SEAT ASSEMBLY (71) Applicant: FORD GLOBAL TECHNOLOGIES, LLC, Dearborn, MI (US)

(72) Inventors: Kurt Leon Kormos, Milford, MI (US); Roy Daniel Chapman, Livonia, MI (US); Daniel Aaron Evans, Royal Oak, MI (US); Robert William Moore, Livonia, MI (US); Ricky Allen Spence, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 15/333,948

(22) Filed: Oct. 25, 2016

(65) Prior Publication Data
US 2018/0111530 A1 Apr. 26, 2018

(51) Int. Cl.
*B60N 2/68* (2006.01)
(52) U.S. Cl.
CPC ............... *B60N 2/682* (2013.01); *B60N 2/68* (2013.01)
(58) Field of Classification Search
CPC .................................. B60N 2/682; B60N 2/68
USPC .................................................... 297/452.18
See application file for complete search history.

(56) References Cited

U.S. PATENT DOCUMENTS

| 4,601,517 A * | 7/1986 | Heesch ............... B60N 2/06 248/429 |
| 5,193,881 A * | 3/1993 | Minai ................ B60N 2/686 297/452.18 |
| 5,599,070 A * | 2/1997 | Pham ................. B60R 22/26 280/808 |
| 7,527,334 B2 | 5/2009 | Kiehler et al. |
| 8,251,451 B2 | 8/2012 | Dziedzic |
| 2007/0039183 A1 | 2/2007 | Krambeck et al. |
| 2007/0182228 A1 | 8/2007 | Elio et al. |
| 2011/0204691 A1 | 8/2011 | Schuhmacher et al. |
| 2014/0265474 A1 | 9/2014 | McCulloch |

FOREIGN PATENT DOCUMENTS

DE 102013207496 A1 7/2014
WO 2015023058 A1 2/2015

OTHER PUBLICATIONS

English Machine Translation of DE102013207496A1.
English Machine Translation of WO2015023058A1.

* cited by examiner

*Primary Examiner* — Timothy J Brindley
(74) *Attorney, Agent, or Firm* — Vichit Chea; King & Schickli, PLLC (57) ABSTRACT

A seat assembly includes a seat back frame, a support and a bracket subassembly. The bracket subassembly connects the seat back frame to the support. The bracket subassembly includes a first bracket having a first attachment feature and a second bracket having a second attachment feature wherein the first and second attachment features engage to lock the bracket assembly around the support. A method of securing a seat back frame to a support is also disclosed.

12 Claims, 7 Drawing Sheets

BRACKET SUBASSEMBLY AND SEAT ASSEMBLY

TECHNICAL FIELD

This document relates generally to the motor vehicle equipment field and, more particularly, to a bracket subassembly for mounting a recliner seat in a motor vehicle as well as to a seat assembly incorporating that bracket subassembly.

BACKGROUND

This document relates to a new and improved bracket subassembly for mounting a recliner seat to a cross car support of a motor vehicle as well as to a seat assembly incorporating that bracket subassembly. Advantageously, the bracket subassembly functions to reinforce the cross car support thereby increasing the strength of the connection while also allowing for simple and efficient assembly particularly at the connection point at the inboard seat back frame arm.

SUMMARY

In accordance with the purposes and benefits described herein, a seat assembly is provided. That seat assembly comprises a seat back frame, a support and a bracket subassembly. The bracket subassembly connects the seat back frame to the support. The bracket subassembly includes a first bracket having a first attachment feature and a second bracket having a second attachment feature wherein the first attachment feature engages the second attachment feature to lock the bracket assembly around the support. In fact, the bracket subassembly fully encompasses the support.

The first bracket may include a body connected to the seat back frame. More particularly, the first bracket is connected to the arm of the seat back frame.

The first attachment feature may include a flange having a first hook at a first end and a second hook at a second end. The second attachment feature may include a third hook at a third end a fourth hook at a fourth end. When assembled, the first hook may engage with the third hook and the second hook may engage with the fourth hook.

The first flange may be contoured to nest over the support. Similarly, the second bracket may be contoured to nest over the support. Thus, the support may be captured and reinforced by the assembled bracket subassembly.

That support may be a cross car support tube mounted to the motor vehicle by a first mounting bracket and a second mounting bracket. The flange of the first bracket may include a first welding window. A first weld bead may be provided to secure the first bracket to the support at the first welding window. Similarly, the second bracket may include a second welding window. A second weld bead may be provided to secure the second bracket to the support at the second welding window.

A bushing may be provided to connect the first bracket to the arm of the seat back frame. Further, the cross car support tube may include a circular cross section and the flange may include an arcuate section extending through an arc of between about 100-180 degrees concentrically around the cross car support tube.

In accordance with an additional aspect, a bracket subassembly is provided. That bracket subassembly comprises a first bracket having a first attachment feature including a flange with a first hook at a first end and a second hook at a second end. The bracket subassembly also includes a second bracket having a second attachment feature with a third hook at a third end and a fourth hook at a fourth end. The first bracket is connected to the second bracket by engaging the first hook with the third hook and the second hook with the fourth hook.

In accordance with still another aspect, a method is provided of securing a seat back frame to a support in a motor vehicle. That method includes the steps of connecting a first bracket to the seat back frame and engaging a first attachment feature on the first bracket with a second attachment feature on a second bracket while capturing the support between the first bracket and the second bracket. The method may further include the steps of engaging a first hook of the first attachment feature with a third hook of the second attachment feature and engaging a second hook of the first attachment feature with a fourth hook of the second attachment feature.

Further, the method may include the step of aligning the first hook with the third hook and the second hook with the fourth hook. This is then followed by the step of sliding the first bracket along the support into engagement with the second bracket.

Still further, the method may include the step of fastening the first bracket to the support and the second bracket to the support. Further, this may be done by welding the first bracket to the support through a first weld window in the first bracket and welding the second bracket to the support through a second weld window in the second bracket.

In the following description, there are shown and described several preferred embodiments of the seat assembly and bracket subassembly. As it should be realized, the seat assembly and bracket subassembly are capable of other, different embodiments and their several details are capable of modification in various, obvious aspects all without departing from the seat assembly and bracket subassembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the seat assembly and bracket subassembly and together with the description serve to explain certain principles thereof. In the drawing figures.

Reference will now be made in detail to the present preferred embodiments of the seat assembly and bracket subassembly, examples of which are illustrated in the accompanying drawing figures.

DETAILED DESCRIPTION

Figure 1:
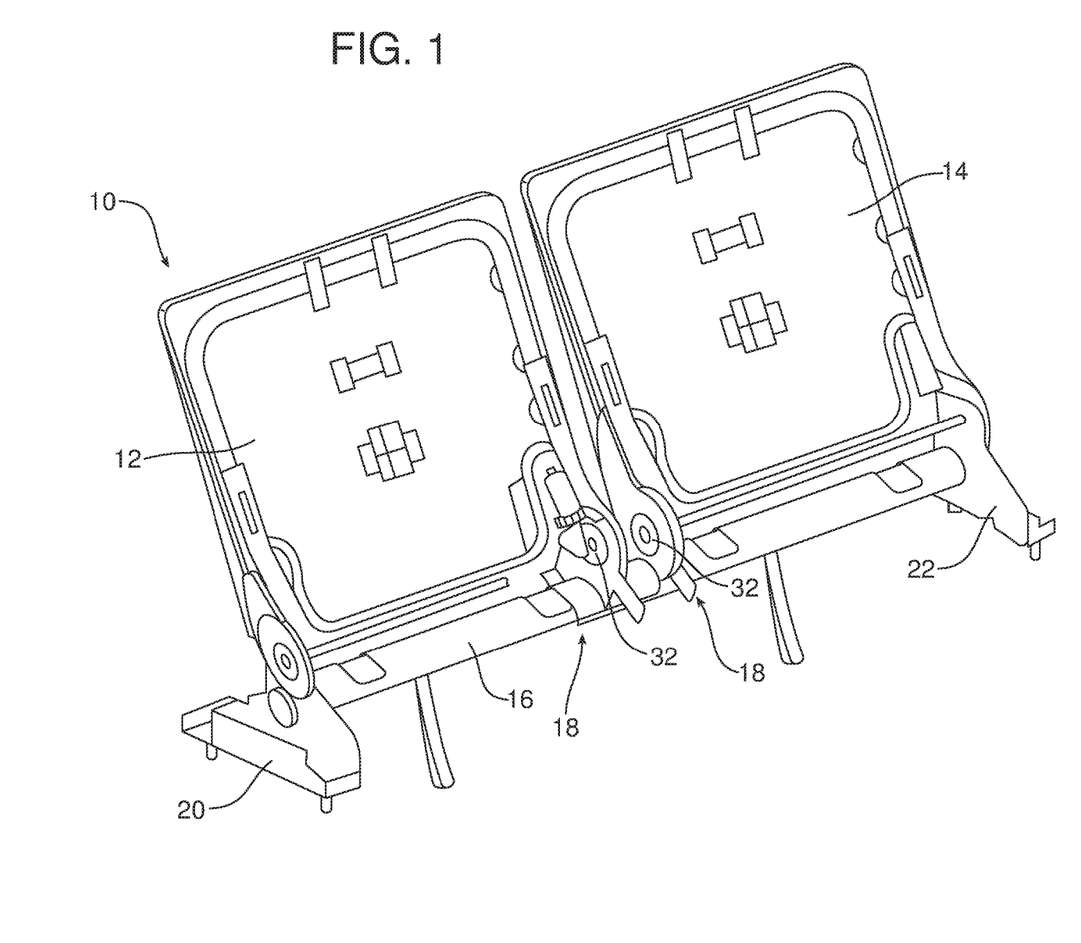
FIG. 1 is a perspective view of a seat assembly including two recliner seat back frames wherein each of the recliner seat back frames is attached by means of a bracket subassembly to a support illustrated as a cross car support that is mounted to the motor vehicle by first and second mounting brackets at the ends thereof.

Reference is now made to FIG. 1 illustrating a seat assembly 10. That seat assembly 10 includes a first seat back frame 12 and a second seat back frame 14 connected to a support 16 by means of a bracket subassembly 18 that will be described in greater detail. In the illustrated embodiment, the support 16 comprises a cross car support tube that is mounted to the floor (not shown) of the motor vehicle by means of a first mounting bracket 20 at a first end of the support 16 and a second mounting bracket 22 at a second end.

Figure 2:
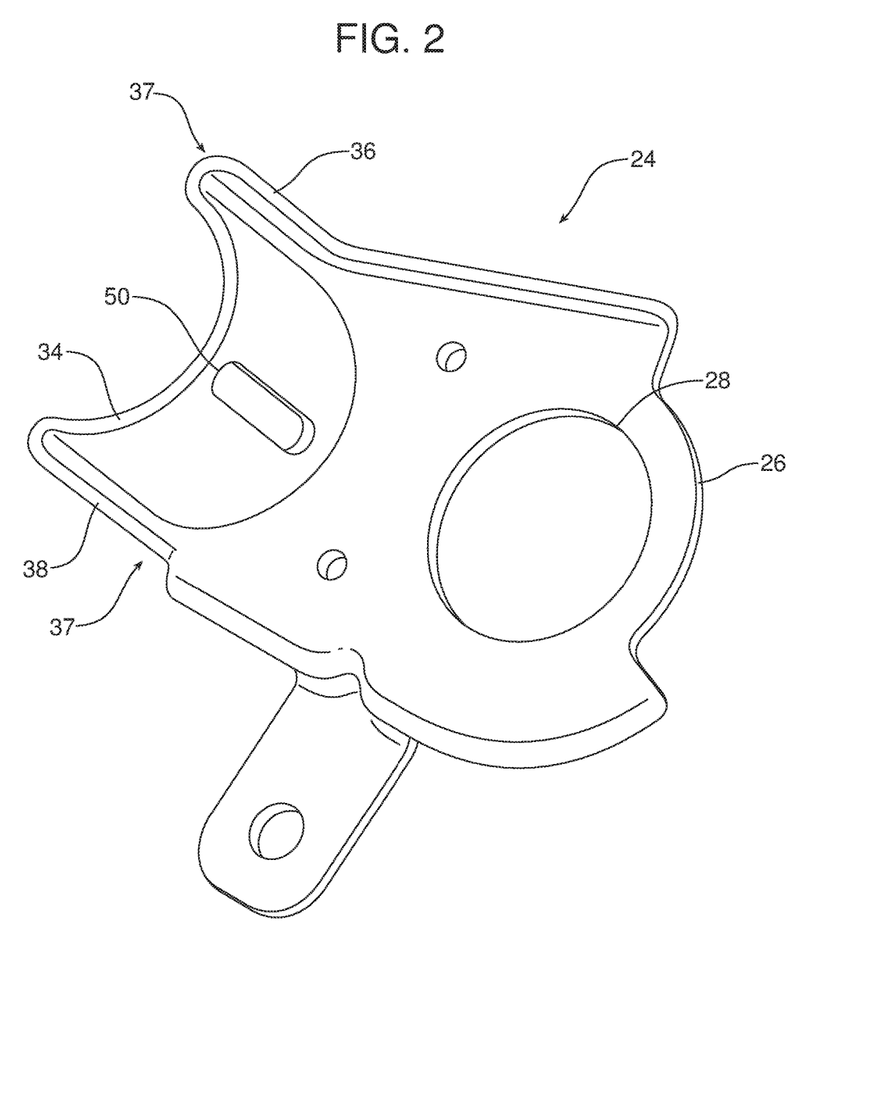
FIG. 2 is a detailed perspective view of the first bracket of the bracket subassembly utilized to secure a seat back frame to the cross car support.

Reference is now made to FIG. 2 illustrating in detail the first bracket 24 of the bracket subassembly 18. As illustrated, the first bracket 24 includes a body 26. The body 26 includes a mounting aperture 28 that allows connection of the first bracket 24 to an inboard arm 30 of either the first or second seat back frame 12, 14 by means of a recliner disc mechanism or bushing 32 that defines a pivot axis about which the seat back frame may be reclined.

Figure 3:
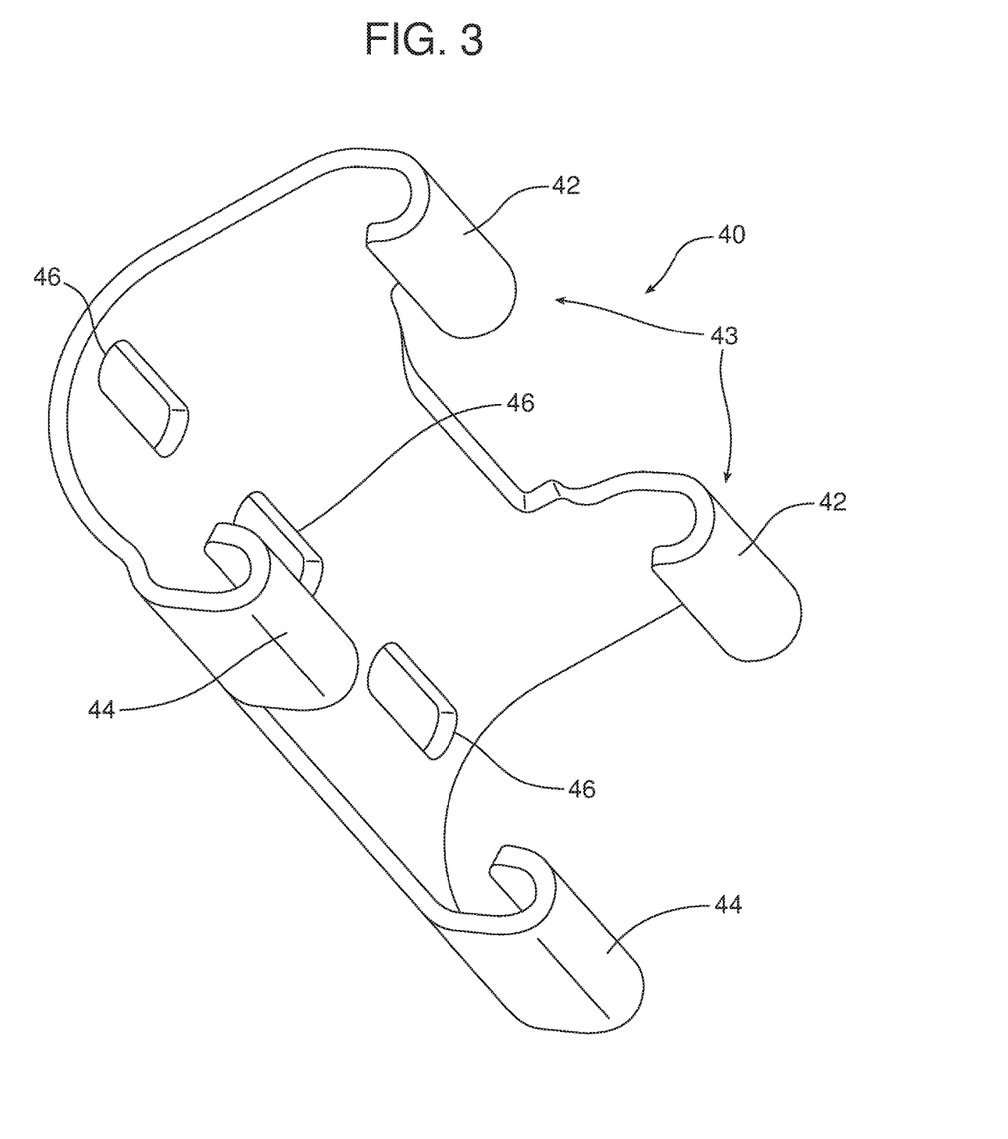
FIG. 3 is a detailed perspective view of the second bracket of the bracket subassembly utilized to secure a seat back frame to the cross car support.

As further illustrated in FIG. 2, the first bracket 24 also includes a flange 34 having a first hook 36 at a first end and a second hook 38 at a second end. As should be appreciated from viewing FIG. 3, the flange 34 is contoured to nest over the support 16 when the bracket subassembly 18 is assembled to mount the first seat back frame 12 or second seat back frame 14 to the support 16. In the illustrated embodiment the cross car support tube/support 16 has a circular cross section. Thus, the flange 34 includes an arcuate section extending through an arc of between about 100-180 degrees and more particularly, 120-180 degrees concentrically around the support.

As best appreciated from reviewing FIGS. 3, 4 and 5a-5c, the bracket subassembly 18 also includes a second bracket 40 having a third hook 42 at a third end and a fourth hook 44 at a fourth end.

When the bracket subassembly 18 is properly assembled, the first attachment feature 37, comprising the first hook 36 and the second hook 38, engages with the second attachment feature 43, comprising the third hook 42 and the fourth hook 44. More specifically, the first hook 36 opens outward while the third hook 42 opens inward. In this way, the first hook 36 and third hook 42 are complementary in shape. This allows the first hook 36 to engage with the third hook 42. Similarly, the second hook 38 opens outward while the fourth hook 44 opens inward. In this way, the second hook 38 and fourth hook 44 are complementary in shape. This allows the second hook 38 to engage with the fourth hook 44.

Figure 4:
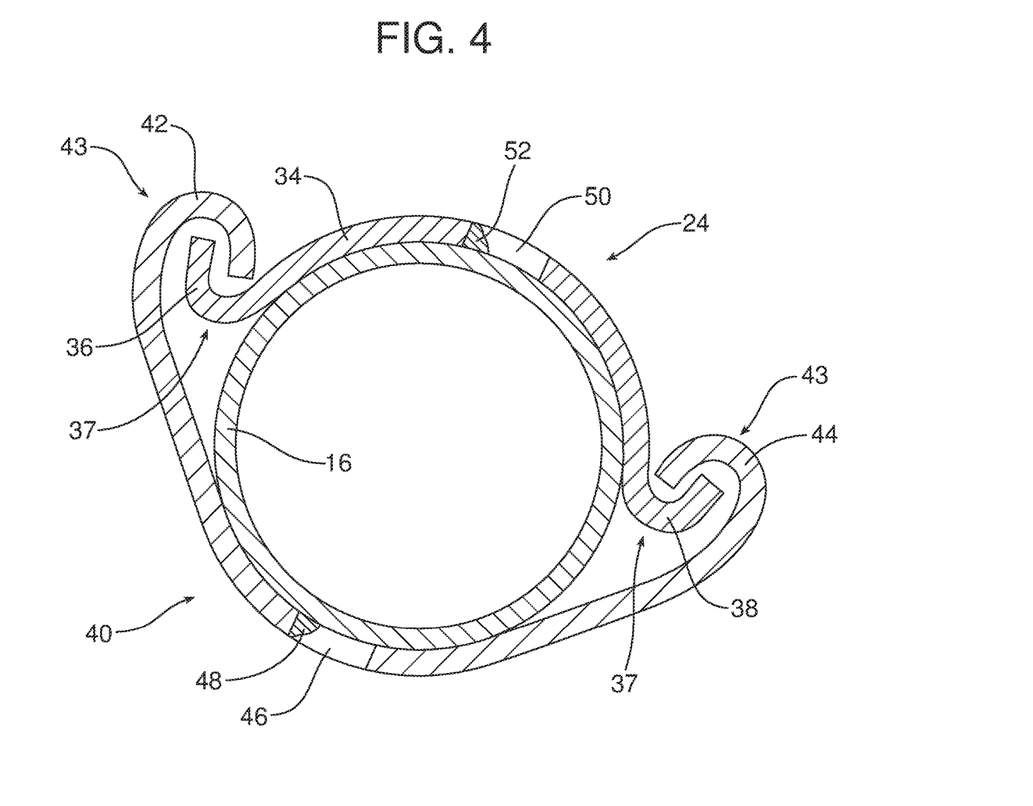
FIG. 4 is a detailed cross sectional view illustrating how the first and second brackets of the bracket subassembly are connected together by means of cooperating hooks so as to nest around and capture the support thereby providing additional strength and structural integrity.

As further illustrated in FIG. 4, the flange 34 of the first bracket 24 and the body of the second bracket 40 are both contoured to nest over and around the support 16. Thus, when the two brackets 24, 40 are connected together, they nest around and capture the support 16 thereby providing a reinforced connection of high strength and integrity.

Figure 5A:
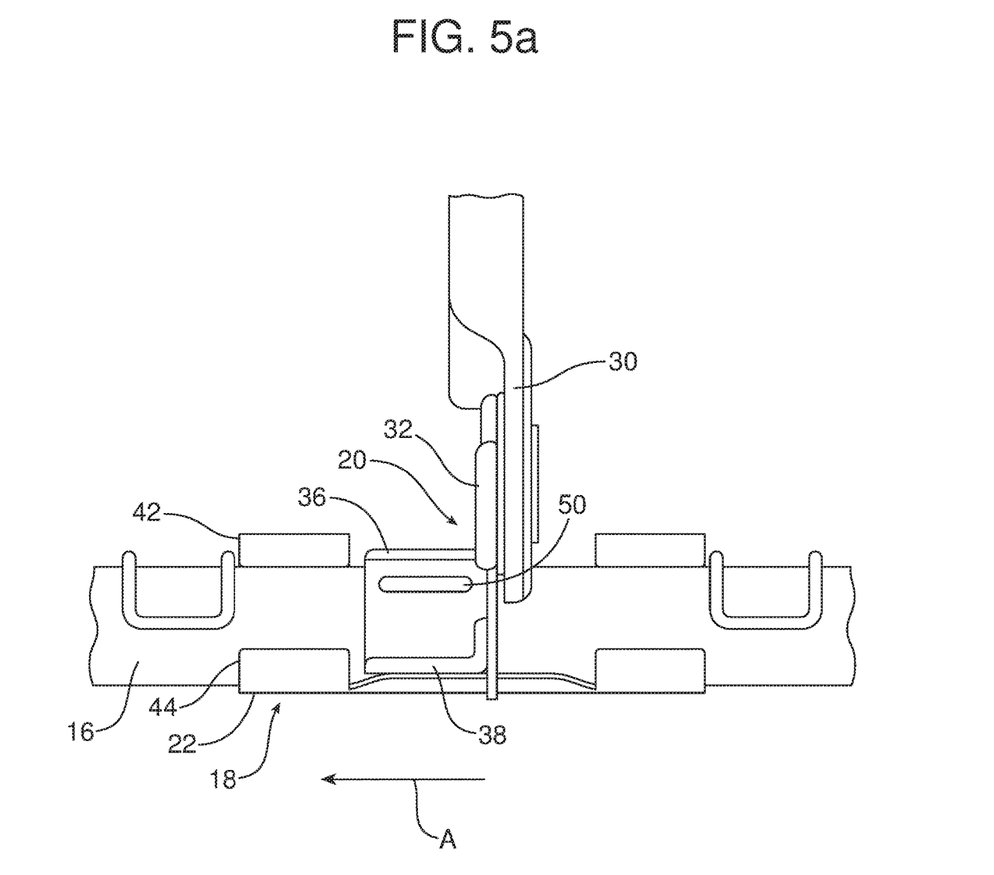
FIGS. 5a-5c are a series of views illustrating a method of securing a seat back frame to a support utilizing the bracket subassembly.
Figure 5B:
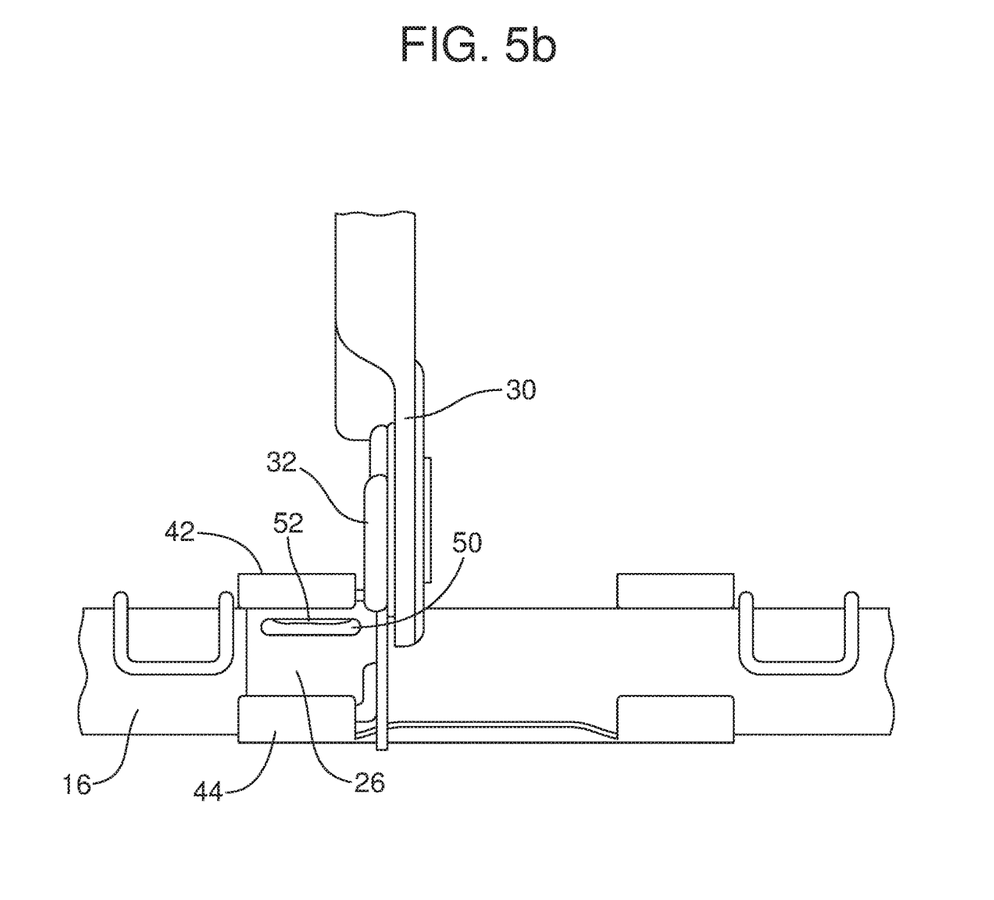
Figure 5C:
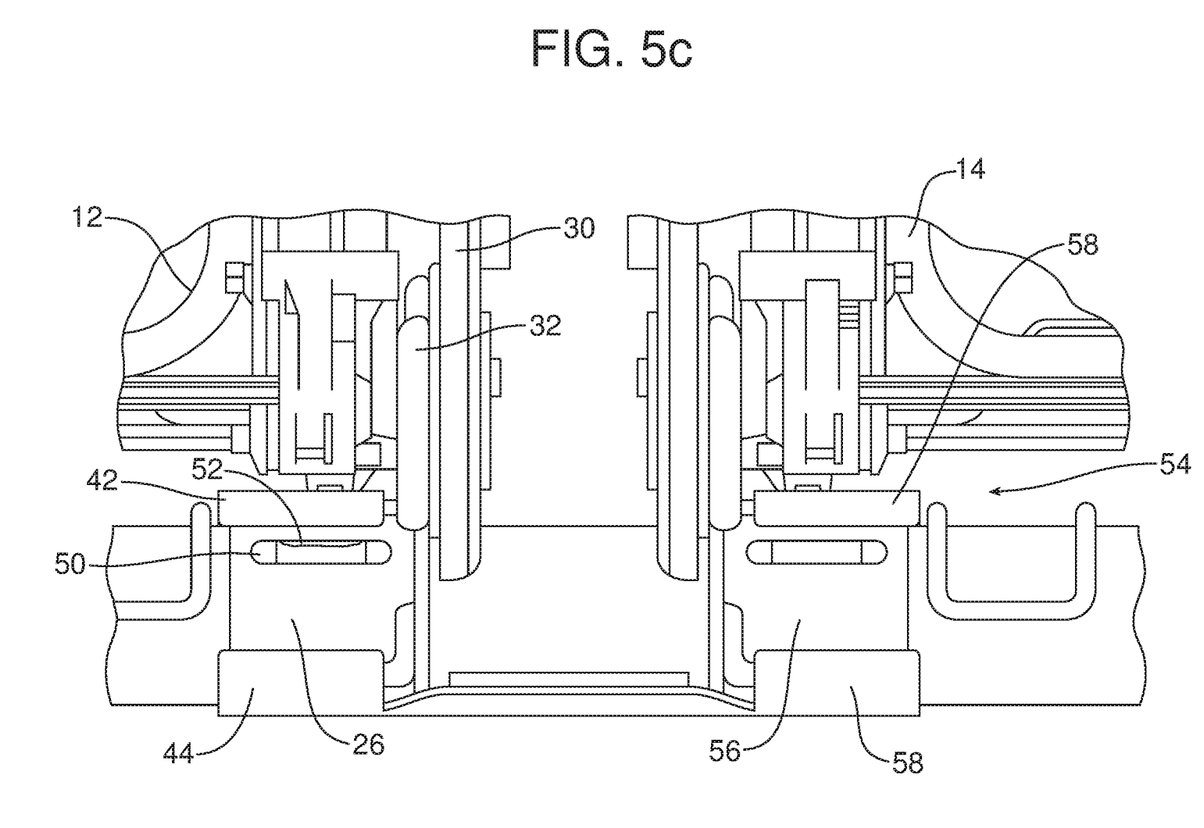

Reference is now made to FIGS. 5a-5c illustrating a method of securing a seat back frame 12, and, more particularly, the inboard arm 30 of the seat back frame 12 to the support 16. That method may be broadly described as including the steps of connecting the first bracket 24 to the seat back frame 12 and then engaging the first attachment feature 37, including the first hook 36 and second hook 38, with the second attachment feature 43, including a third hook 42 and a fourth hook 44 while capturing the support 16 between the first bracket 24 and the second bracket 40. As illustrated in FIG. 5a, the first bracket 24 is connected to the inboard arm 30 of the seatback frame 12 by means of the bushing 32.

The second bracket 40 is secured to the support 16 at the proper location. In the illustrated embodiment, the second bracket 40 includes a second welding window 46 in the contoured body between the third hook 42 and the fourth hook 44 (see FIGS. 3 and 4). When properly positioned, a second weld bead 48 is provided at the second welding window 46 to complete the connection and secure the second bracket 40 to the support 16 in the desired position. Note, in FIG. 3, there are three windows 46 and each may include a weld bead 48.

Next, the first seat back frame 12 is manipulated to bring the first bracket 24 into nesting engagement with the support 16 adjacent the second bracket 40 with the first hook 36 aligned with the third hook 42 and the second hook 38 aligned with the fourth hook 44 (again see FIG. 5a). As should be appreciated from reviewing FIG. 4, the first hook 36 and second hook 38 open in one direction while the third hook 42 and the fourth hook 44 open in the opposite direction. Accordingly, one simply slides the first seat back frame 12 and first bracket 24 along the support 16 in the direction of action arrow A in order to bring the first hook 36 into engagement with the third hook 42 and the second hook 38 into engagement with the fourth hook 44 as illustrated in FIG. 4 and FIG. 5b.

When the first and second hooks 36, 38 of the first attachment feature 37 on the first bracket 24 are fully engaged respectively with the third hook 42 and fourth hook 44 of the second attachment feature 43 on the second bracket 40, the first bracket 24 is secured to the support. In the illustrated embodiment, this is done by welding. More specifically, the body 26 of the first bracket 24 includes a first welding window 50. A first welding bead 52 is provided at the first welding window 50 in order to complete the connection of the first bracket 24 with the support 16. FIG. 5c illustrates the completed connection with the welding bead. FIG. 5c also illustrates how the second seat back frame 14 is mounted in the same manner utilizing a second bracket subassembly, generally designated by reference numeral 54, including a second first mounting bracket 56 and a second mounting bracket 58.

The seat assembly 10 and bracket subassembly 18 provide a number of benefits and advantages. More specifically, the seat assembly 10 and bracket subassembly 18 provide for simple and efficient mounting of a seat back frame 12, 14 to a support 16 such as the cross car support tube illustrated in the drawing figures. This effectively reduces assembly time and virtually eliminates assembly errors. The simple sliding connection of the first bracket 24 with the second bracket 40 is accommodated by the orientation of the first, second, third and fourth hooks 36, 38, 42, 44 which open along axes adjacent and parallel to the support 16. Further, because the first and second brackets 24, 40 are contoured to nest around and engage the support 16 when assembled together, the bracket subassembly 18 effectively reinforces and increases the structural integrity of the connection of the seat back frames 12, 14 to the support 16.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A seat assembly, comprising:
   a seat back frame;
   a support; and
   a bracket subassembly connecting said seat back frame to said support, said bracket subassembly including a first bracket having a first attachment feature and a second bracket having a second attachment feature wherein said first attachment feature engages said second attachment feature to lock said bracket subassembly and capture said support between said first bracket and said second bracket, wherein said first bracket includes a body connected to said seat back frame, said first attachment feature includes a flange having a first hook at a first end and a second hook at a second end, said second attachment feature includes a third hook at a third end and a fourth hook at a fourth end, said first hook engages with said third hook and said second hook engages with said fourth hook, said flange is contoured to rest over said support and said second bracket is contoured to rest over said support and said support is a cross car support tube mounted to a motor vehicle by a first mounting bracket and a second mounting bracket.

2. The seat assembly of claim 1, wherein said flange includes a first welding window and a first weld bead secures said first bracket to said support at said first welding window.

3. The seat assembly of claim 2, wherein said second bracket includes a second welding window and a second weld bead secures said second bracket to said support at said second welding window.

4. The seat assembly of claim 3, further including a bushing connecting said first bracket to an arm of said seat back frame.

5. The seat assembly of claim 4, wherein said cross car support tube includes a circular cross section and said flange includes an arcuate section extending through an arc of about 100-180 degrees concentrically around said cross car support tube.

6. A method of securing a seat back frame to a support, comprising:
   connecting a first bracket to said seat back frame;
   engaging a first attachment feature on said first bracket with a second attachment feature on a second bracket while capturing said support between said first bracket and said second bracket;
   engaging a first hook of said first attachment feature with a third hook of said second attachment feature; and
   engaging a second hook of said first attachment feature with a fourth hook of said second attachment feature.

7. The method of claim 6, including aligning said first hook with said third hook and said second hook with said fourth hook.

8. The method of claim 7, including sliding said first bracket along said support into engagement with said second bracket.

9. The method of claim 8, including fastening said second bracket to said support.

10. The method of claim 9, including fastening said first bracket to said support.

11. The method of claim 8, including welding said second bracket to said support through a second weld window in said second bracket.

12. The method of claim 11, including welding said first bracket to said support through a first weld window in said first bracket.

* * * * *